United States Patent
Wischoeffer (12)

(10) Patent No.: US 6,426,705 B1
(45) Date of Patent: Jul. 30, 2002

(54) CONTROL THAT ENABLES/DISABLES A USER INTERFACE

(75) Inventor: William Shawn Wischoeffer, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/165,484

(22) Filed: Oct. 2, 1998

(51) Int. Cl.[7] ................................................ H04Q 1/00
(52) U.S. Cl. .............................. 340/825.69; 340/5.74; 340/5.21; 340/825.22; 348/734
(58) Field of Search ....................... 340/825.69, 825.72, 340/825.22, 5.74, 5.21; 386/94; 359/142; 348/734, 5.5; 341/176

(56) References Cited

U.S. PATENT DOCUMENTS

| | | | |
|---|---|---|---|
| 4,355,415 A | | 10/1982 | George et al. ............... 455/185 |
| 4,375,651 A | | 3/1983 | Templin et al. .......... 358/191.1 |
| 4,510,623 A | | 4/1985 | Bonneau et al. ............. 455/181 |
| 4,718,107 A | | 1/1988 | Hayes ............................. 455/4 |
| 5,005,084 A | * | 4/1991 | Skinner ................. 340/825.69 |
| 5,053,884 A | | 10/1991 | Kamijyo ..................... 358/349 |
| 5,187,469 A | * | 2/1993 | Evans ................... 340/825.69 |
| 5,382,983 A | | 1/1995 | Kwoh et al. ................ 348/716 |
| 5,550,575 A | | 8/1996 | West et al. ................... 348/5.5 |
| 5,583,576 A | | 12/1996 | Perlman et al. ............. 348/460 |
| 5,619,251 A | | 4/1997 | Kuroiwa et al. .............. 348/12 |
| 6,025,869 A | * | 2/2000 | Stas ............................. 348/5.5 |
| 6,122,434 A | * | 9/2000 | Sawabe ....................... 386/94 |

OTHER PUBLICATIONS

8–IN–1 Universal Remote Control, 1990 Tandy Corporation, pp. 12–18.*
Internet article: "The 'V–Chip' and View Control", ©Benton Foundation, Washington, D.C. (www.benton.org/Policy/TV/debate.html); 1 pg.
TVGuardian Home Page(www.tvguardian.com); 2 pgs.
K–ISI's "Rating Lockout" p. (www.k–isi.com/ratings.html); 1 pg.
"Scientific Atlanta 8600—Parental Control", Paragon Cable Co. (www.paragonpdx.com/sa8600.html); 1 pg.

* cited by examiner

Primary Examiner—Brian Zimmerman
(74) Attorney, Agent, or Firm—Sitrick & Sitrick

(57) ABSTRACT

A master control which may be on a wireless remote control for example which allows a user such as a parent to disable and enable all or some of the functions of a user interface on an electrically controlled device whereby users of the electrically controlled device such as children who are without knowledge of or access to the control are prevented from altering the state of the device. The electrically controlled device may include, but are not limited to, a television, CA TV, satellite TV, VCR, audio receivers and automobiles.

22 Claims, 1 Drawing Sheet

CONTROL THAT ENABLES/DISABLES A USER INTERFACE

BACKGROUND OF THE INVENTION

This invention relates to a control apparatus for a user who wishes to have complete control of an electrically controlled device or devices. Instances may range from the desire to prevent a curious young child from interfering with a television or radio program by pressing various buttons on electrically controlled devices to the situation where parents desire to control television signal receiving devices to prevent the receipt of certain programs. In the field of television, for example, there has been a recent proliferation of programs containing scenes, language and violence which many people consider to be objectionable, especially for children and minors. This proliferation, combined with the new expansion of cable and satellite distribution that brings hundreds of channels of varying content to nearly every point on earth, has created a very critical need for users to be able to exercise their discretion to selectively inhibit or block out the viewing and listening of undesirable materials.

There are numerous arrangements of what will be broadly categorized to as "parental control devices", however, none include the advantageous features of the invention. Thus, some devices have a lock, but when locked, the device is inoperable, i.e. it cannot perform its intended function. As applied to the television example, one using the prior art devices could not watch TV if the television were locked. Other lock-out devices, such as shown in U.S. Pat. Nos. 4,355,415; 4,375,651; 4,510,623 and 4,718,107, block certain channels from being viewed. The user programs those channels to be blocked. The user then enters a multi-digit numerical access code or locks a mechanical key switch thereby preventing alteration of the locked channel list by persons not possessing the key or having knowledge of the access code. To watch a blocked program or reprogram the blocked channel list, the user must first unlock the key switch or enter the correct access code. These require the memorization of an access code. In others, such as U.S. Pat. No. 5,550,575, the device allows discretion based on the content of certain programs. In U.S. Pat. No. 5,583,576, programs having certain ratings are selectively inhibited. Others such as shown in U.S. Pat. No. 5,382,983 allow parental control of television use by excluding or including selected programs, channels and or times.

While allowing parental control, the foregoing prior art devices and approaches are somewhat complicated and require the use of features such as program ratings which may not be available on all programs.

FIELD OF THE INVENTION

The present invention relates to a control apparatus that can selectively enable or disable predefined functions of a user interface to prevent persons without knowledge of or access to the control from altering the state of an electrically controlled device. The control includes a master controller having a user interface that overrides and controls a user interface on the electrically controlled device. The master controller user interface may be on a remote control for an electrically controlled device such as a television whereby the master controller may lock out all or some of the functions of the user interface on the electrically controlled device to preclude the receipt of various channels or programs or other interference with the functions such as on, off, volume, etc. In this way, an adult could prevent a curious pre-school child who may be able to reach and press buttons on a television console or car radio or stereo receiver, from interfering with what the adult is, watching or listening to.

SUMMARY OF THE INVENTION

The purpose of the present invention is to provide a simple master control unit that is capable of overriding and enabling or disabling a user interface on electrically controlled devices whereby users of the interface electrically controlled device may not alter the operation or function of that device which has been disabled by the master control unit. For example, the master control unit may be a wireless remote control for a television receiver. Each of the master unit and the electrically controlled device will have a user interface. However, the user interface on the electrically controlled device may be overridden in whole or in part by the user interface on the master control unit in response to signals sent by the master unit. In this way, an adult could prevent a curious child who may be able to reach and press buttons on the television console from interfering with what the adult is watching or listening to. This overcomes one of the problems of the prior art where the locks either totally disabled the television set or had to be made directly on the user interface of the television console or, if made on the remote, also blocked out the remote. By contrast, with this invention, the parent with the master remote may still retain full access to the television receiver while the user of the user interface on the television console or a slave remote control will be barred from accessing the locked functions or features.

This allows persons with knowledge of an access to the master control to prevent persons without knowledge of or access to the master control from altering the state of the device. The master control may include a suitable security means for precluding unauthorized persons with access to the master control from changing the features without authorization.

DETAILED DESCRIPTION OF A PREFERRED EMBODIMENT

Figure 1:
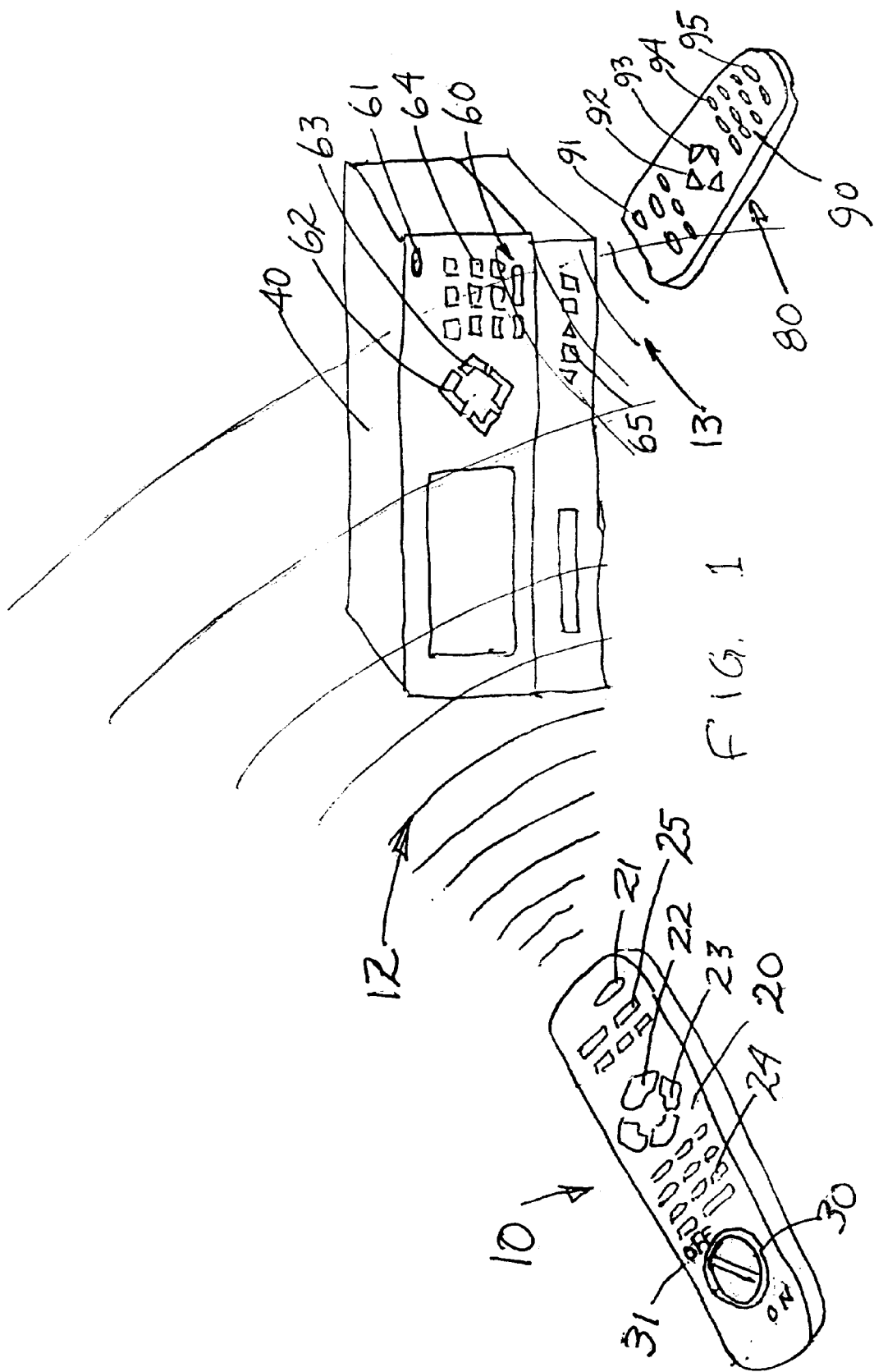
FIG. 1 is a schematic representation of a system according to the invention wherein a master controller may disable/enable the user interface controls on an electrically controlled device and a slave remote control.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

Referring to the drawing, there is shown in FIG. 1 a master control unit 10 having a first user interface 20 capable of sending signals schematically represented at 12 to be received by second and third user interfaces 60 and 90 on an electrically controlled device 40 and on a slave remote 80 respectively. Slave remote 80 is capable of sending signals 13 to user interface 60.

The control apparatus for selectively enabling and disabling predefined functions of a user interface on an electrical device 40 includes a master controller 10 having a user interface 20 having a plurality of switches 21–25, 30, and 31, a second user interface 60 on the device 40 having switches 61–65, and a third user interface on a slave remote 80 having switches 91–95. The electrical device 40 provides the predefined functions and has a user interface 60 for controlling all or selected ones of the predefined functions of the electrical device. The electrical device user interface switches 61–65 are actuatable separately and directly by a user and the electrical device 40 is further responsive to the master control user interface 20 to provide for control of the selection of and enabling and disabling of the predefined functions of the electrically controlled device. Each of the master controller user interface 20 and slave 80 provide to electrical device user interface 60 signals 12, 13 representative of a plurality of control functions to which the electrical device 40 responds. The master controller provides an output of a unique control signal 12 responsive to user activation of a corresponding one of the switches of the master controller user interface. The electrical device 40 is responsive to the unique control signal output to provide for at least one of selectively disabling and selectively enabling a corresponding one of the functions in response to the respective unique control signal. The respective unique control signal is comprised of a plurality of control signals, each associated with a respective corresponding function, and at least one of the switches is uniquely associated with generation of the unique control signal.

In the illustrated embodiment, each of the user interfaces has means for providing a unique control signal output to provide for selectively disabling and selectively enabling one of the functions of the electrical device such as, for example, an on and off switch shown at 21, 61, and 91 respectively; channel up and down switches, 22, 62, and 92 respectively; volume up and down switches 23, 63, and 93 respectively; and other control means such as numeric key pads, 24, 64, and 94 respectively; as well as VCR controls 25, 65, and 95 respectively. Each of the user interfaces 20, 60 and 90 may be used to enable or disable predefined functions of the electrically controlled device 40 such as turning a television on or off, changing the channel, changing the volume, programming a VCR, etc.

In the embodiment shown, the master controller or control unit 10 for the electrically controlled device 40 has an additional user controllable signal sender or master unit switch 30 capable of sending signals receivable by user interfaces 60 and 90. This additional signal sender switch 30 is capable of sending signals to said user interfaces 60 and 90 which override and enable or disable some or all of the user function selection controls on the other user interfaces. This means users of the user interfaces 60 and 90 may not alter the operation or function of the electrically controlled device 40 by means of the disabled functions. Thus, for example, when the master unit switch 30 on the first user interface 20 has disabled the "on" switch 61 on the second user interface 60 and/or the "on" switch 91 on the third user interface 90, users of the second and third interface may not turn on the electrically controlled device however, the user of the first user interface 21 may still enable or turn on the device 40. It will be understood that sets of controllers may be configured as master controller, i.e., the override disable/enable control may be on more than one interface and each will control all other interfaces.

In operation, the enable/disable function would proceed by way of example as follows: to disable, the user would push the master unit switch 30 illustrated in the form of an international "no" sign in the area of 31 including the word "off". The user would then press certain ones of the function keys on the user interface 20 which the user desired to disable, and when these have all been pushed consecutively, the off button 31 would be again be pushed to complete the disablement function. In one embodiment, the pressing of the "off" side button 31 of the button 30 would cause a prompt screen to be displayed on the television so that the user is presented with a visual display to aid in a clear understanding of the functions that are to be or being disabled.

It is also possible for the user to set specific times or time periods during which each of the functions will be enabled or disabled. This will allow the master control user to allow use of specific channels carrying varying types of programs to allow use on specific periods such as Saturday or Sunday mornings when for example children's programs are most likely are to be aired.

In practice it has been found that the master control will provide a presentation output signal that will be received by the user interface on the electrically controlled device where logic in the form of an algorithm will disable or enable the function.

In a preferred embodiment, each of the master control unit 10 and the first, second and third user interfaces (20, 60, 90) and electronically controlled device 40, and slave remote 80, are comprised of logic, such as a microcomputer with processor, ROM, RAM, and I/O interface, appropriately programmed in accordance with the teachings of the present invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A control apparatus for selectively enabling and disabling a user interface controlling predefined functions of an electrical device, the apparatus comprising:

a master controller having a master controller user interface comprising a plurality of switches, wherein the master controller is further comprised of a remote control transmitter and is physically separate from the electrical device;

wherein said master controller provides an output of a unique control signal responsive to user activation of a corresponding one of the plurality of switches of the master controller; and an electrical control within the electrical device having an electrical device user interface comprising a plurality of switches, the electrical control providing operability in one of a plurality of operable modes;

wherein said electrical device user interface is operable in an enabled operable mode wherein the electrical device user interface is actuatable separately and directly by a user for controlling at least one of the predefined functions of said electrical device;

wherein the electrical device user interface is operable in a disabled operable mode responsive to the master controller user interface, wherein in the disabled operable mode there is provided control of the selective disabling of response to at least one of the plurality of switches of the electrical device user interface that controls said predefined functions of said electrical device; and wherein responsive to the unique control signal output of the master controller the electrical device user interface is selectively disabled and selectively enabled to control the selected ones of predefined functions of said electrical device.

2. The apparatus as in claim 1, wherein the respective unique control signal is comprised of a plurality of control signals, each associated with a respective corresponding function.

3. The apparatus as in claim 1, wherein at least one of the switches is uniquely associated with generation of the unique control signal.

4. The apparatus as in claim 3, wherein two separate ones of the switches of the master controller are respectively uniquely associated with generation of separate respective enable and disable unique control signals; and
   wherein the electrical device is responsive to the enable and disable unique control signals to respectively enable and disable the electrical device user interface responsible for an associated function.

5. The apparatus as in claim 1, wherein a portion of said electrical device user interface controls at least one of the functions of a television signal receiver, comprised of on and off, and the selection of channels, audio volume, pay-for-view codes; and
   wherein said master controller provides for selectively enabling and disabling the portion of the electrical device user interface responsible for each of these functions of the television signal receiver individually.

6. The apparatus as in claim 5, wherein the television signal receiver receives the television signals through at least one of a cable, an antenna connection and a satellite dish receiver.

7. The apparatus as in claim 1,
   wherein a portion of said electrical device user interface controls the functions of a video recorder apparatus comprised of play, stop, record, reverse, fast forward and pause; and
   wherein said master controller selectively disables and enables the portion of the electrical device user interface responsible for at least one of these functions of the video recorder apparatus individually.

8. The apparatus as in claim 1,
   wherein at least a portion of said electrical device user interface controls the functions of an automobile comprised of ignition, lights, radio, door locks, and storage locks; and
   wherein said master controller provides for being selectively capable of disabling and enabling the portion of the electrical device user interface responsible for at least one of these functions of the automobile individually.

9. The apparatus as in claim 1,
   wherein a portion of said electrical device user interface controls the functions of a laser disk player comprised of play, stop, reverse and fast forward; and
   wherein said master controller is operable to selectively disable and enable the portion of the electrical device user interface responsible for at least one of these functions of the laser disk player individually.

10. A The apparatus as in claim 1, wherein the electrical device user interface is mounted to the electrical device being controlled.

11. The apparatus as in claim 1, wherein the master controller is seperable from the electrical device.

12. The apparatus as in claim 1, wherein each of said master controller user interface and electrical device user interface provide signals representative of a plurality of control functions to which the electrical device responds.

13. The apparatus as in claim 1, wherein the master controller user interface is physically separate from the electrical device user interface.

14. A user interface control system comprising:
   a master controller apparatus having a master controller user interface, wherein the master controller is further comprised of a remote control transmitter and is physically separate from the electrical device;
   an electrically controlled device separate from the master controller and having an electrical device user interface;
   wherein each of said master controller user interface and electrical device user interface is separately capable of controlling a plurality of predefined operations of said electrically controlled device;
   wherein each of said electrical device user interface and said master controller user interface has user actuatable controls selectively capable of controlling at least one of the plurality of predefined operations of said electrically controlled device;
   wherein said master controller user interface selectively provides an output of user control signals;
   wherein the electrical device user interface is responsive to the user control signals to provide for selectively disabling the responsiveness of the electrical device user interface as to at least one of the predefined operations responsive to a first one of the user control signals; and
   wherein the electrical device user interface is responsive to the user control signals to provide for selectively enabling the responsiveness of the electrical device user interface as to at least one of the predefined operations responsive to a second one of the user control signals.

15. The system as in claim 14,
   wherein a portion of said electrical device user interface controls functions of a video recorder apparatus, said functions comprising play, stop, record, reverse, fast forward and pause; and
   wherein said master controller selectively disables and enables the portion of the electrical device user interface responsible for at least one of these video recorder apparatus functions individually.

16. The system as in claim 14,
   wherein a portion of said electrical device user interface controls the functions of an automobile, said functions comprising ignition, lights, radio, door locks and storage locks; and
   wherein said master controller provides for selectively disabling and enabling the portion of the electronically controlled device user interface responsible for at least one of these automobile functions individually.

17. The system as in claim 14, wherein a portion of said electrical device user interface controls functions of a laser disk player, said functions comprising play, stop, reverse and fast forward, and
   wherein said master controller is operable to selectively disable and enable the portion of the electronically controlled device user interface responsible for at least one of these laser disk player functions.

18. The system as in claim 14, further comprising an additional remote user interface for said electrically controlled device;
   wherein said additional remote user interface is selectively enabled and disabled responsive to said master controller apparatus.

19. The apparatus as in claim 18 wherein said third user interface has user actuatable controls capable of controlling a plurality of predefined operations of said electrically controlled device;

wherein said control signals from said first user interface provide for selectively disabling and enabling of the responsiveness of the electrically controlled device to the third user interface as to at least one of the predefined operations.

20. The system as in claim 14, further comprising another user interface having user actuatable controls capable of controlling a plurality of predefined operations of said electrically controlled device;

wherein said control signals from said master controller user interface provide for selectively disabling and enabling the responsiveness of the electrical controlled device to said another user interface as to at least one of the predefined operations.

21. The system as in claim 14, wherein said user actuatable controls are switches.

22. The system as in claim 14, wherein said electrical device user interface controls a television signal receiver functions, said functions comprising on and off, the selection of channels, audio volume, and pay-for-view codes; and wherein said master controller provides for selectively enabling and disabling the electrical device user interface responsible for each of these television signal receiver functions.

* * * * *